(12) United States Patent
Tamaki et al.

(10) Patent No.: US 7,095,996 B2
(45) Date of Patent: Aug. 22, 2006

(54) WIRELESS COMMUNICATION SYSTEM, AND DEMODULATION METHOD AND DATA RATE CONTROL METHOD THEREFOR

(75) Inventors: Satoshi Tamaki, Kokubunji (JP); Seishi Hanaoka, Tokyo (JP); Takashi Yano, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 423 days.

(21) Appl. No.: 10/760,299

(22) Filed: Jan. 21, 2004

(65) Prior Publication Data

US 2005/0054319 A1    Mar. 10, 2005

(30) Foreign Application Priority Data

Sep. 10, 2003    (JP) ............................. 2003-317708

(51) Int. Cl.
*H04B 1/10* (2006.01)
(52) U.S. Cl. .................... 455/296; 455/23; 455/42; 455/102; 455/108; 455/205; 455/222; 375/219; 375/221; 375/259; 375/261; 375/298; 332/103; 332/104; 332/105
(58) Field of Classification Search .............. 455/23, 455/42, 102, 108, 205, 222, 296; 375/219, 375/221, 259, 261, 298; 332/103, 104, 105
See application file for complete search history.

(56) References Cited

U.S. PATENT DOCUMENTS

| | | | |
|---|---|---|---|
| 5,555,276 A * | 9/1996 | Koenck et al. ............. 375/303 |
| 2003/0074476 A1* | 4/2003 | Kim et al. .................. 709/246 |
| 2003/0086375 A1 | 5/2003 | Yano et al. | |
| 2004/0228271 A1* | 11/2004 | Marzetta ..................... 370/210 |

\* cited by examiner

*Primary Examiner*—Nay Maung
*Assistant Examiner*—Tuan H. Nguyen
(74) *Attorney, Agent, or Firm*—Reed Smith LLP; Stanley P. Fischer, Esq.; Juan Carlos A. Marquez, Esq.

(57) ABSTRACT

A transmitter and a receiver share a maximum number of transmission bits per symbol as a parameter. The transmitter modulates an encoded and interleaved transmission signal in accordance with a modulation scheme which enables the transmission of one bit or more per symbol, while the receiver demodulates a received signal based on a channel quality in accordance with a modulation scheme which has a higher modulation level as the channel quality is higher. When the number of demodulated bits per symbol is smaller than the maximum number of transmission bits per symbol, the receiver deinterleaves and decodes a received signal after the demodulation on the assumption that the received signal has likelihoods of zero as much as the number of missing bits.

20 Claims, 7 Drawing Sheets

WIRELESS COMMUNICATION SYSTEM, AND DEMODULATION METHOD AND DATA RATE CONTROL METHOD THEREFOR

BACKGROUND OF THE INVENTION

1. Field of the Invention

The present invention relates to a wireless communication system which relies on multi-valued modulation for transmitting an error correcting code and information of one bit or more per symbol, and a demodulation method and a data rate control method associated with the wireless communication system for improving the reception quality when the gain, interference, and/or noise power vary on a channel.

2. Description of the Related Art

The multi-valued modulation has been known for transmitting information of a plurality of bits per symbol in order to increase the transmission amount per unit time in a wireless communication system.

The multi-valued modulation exhibits a higher maximum throughput on a channel of high quality as the number of bits per symbol increases, but experiences a largely reduced throughput, if the channel is degraded in quality, as the number of bits per symbol increases. Thus, adaptive modulation has been proposed for switching the modulation level in accordance with the channel quality in order to ensure stable communications. The adaptive modulation is described, for example, in an article entitled "Performance of Modulation Level Controlled Adaptive Modulation Systems" (Transactions of the Institute of Electronics, Information and Communication Engineers B-II, Vol. J78-B-II, No. 6, pp. 435–555, June 1995).

Normal transmission data is processed in the following manner. In an originating communication device, a channel encoder first encodes data to be transmitted. While wireless communications often employ convolution encoding and turbo encoding as an encoding method, the encoding method need not be limited to those, but any other encoding method may also be applied to wireless communications. Encoded codewords are applied to a QAM (Quadrature Amplitude Modulation) adaptive modulator for modulation, and a resulting baseband signal after the modulation is converted to a signal in a radio frequency band by a RF module for transmission. On the other hand, a receiving wireless communication device receives an RF signal through an antenna, and converts the received RF signal to a signal in a base band in a RF module. The baseband signal is first demodulated by a QAM demodulator which inputs the resulting signal demodulated thereby (likelihood) to a channel decoder which decodes the demodulated signal.

In the adaptive modulation scheme, the modulation level in the originating communication device must be matched with the demodulation level in the receiving communication device. Specifically, the modulation level m in the QAM adaptive modulator of the originating communication device is determined in the following manner. First, the situation on a channel immediately before a received signal is demodulated in the receiving communication device (or before a current time) is measured using an S/N measuring device or the like. Next, an S/N information generator generates a signal for transmitting the result of the measurement from the receiving communication device to the originating transmission device. Then, a modulator modulates the generated information for transmission. In the originating communication device, the received signal is demodulated in a demodulator to acquire the channel situation such as S/N information. The channel situation is determined from the acquired S/N information and the like, and the modulation is performed at a high modulation level if a good situation is found on the channel, whereas the modulation is performed at a low modulation level, if a bad situation is found on the channel. A series of these control operations form a feedback system.

With the conventional adaptive modulation described above which switches the modulation level in accordance with the varying situation on the channel, the receiver needs to know a scheme used by the transmitter in the modulation, so that the transmitter must communicate information on the modulation scheme to the receiver.

Further, when an error occurs in the information on the modulation scheme, the receiver will incorrectly demodulate signals, resulting in a failure of data communication, so that the information on the modulation scheme must be communicated with high accuracy.

In addition, the requirement for correctly matching the modulation scheme between the transmitter and receiver as mentioned above causes a time delay from the measurement of the channel quality to the switching of the modulation scheme, so that the receiver cannot appropriately switch the modulation scheme in response to a sudden change on the channel, thereby failing to sufficiently utilize the channel for communications.

SUMMARY OF THE INVENTION

The present invention has been made to solve the problems mentioned above, and it is an object of the invention to provide a communication system which is capable of switching the number of bits communicated per symbol in response to a varying situation on a channel without the need for communicating information on a correct modulation scheme between a transmitter and a receiver, and a communication system which is capable of adjusting the throughput in response to a varying situation on the channel.

To achieve the above object, in a communication system according to a first aspect of the present invention, a transmitter and receiver share a maximum number of transmission bits per symbol as a parameter. The transmitter modulates an encoded and interleaved transmission signal in accordance with a modulation scheme which enables the transmission of one or more bits per symbol. When the number of bits per symbol which can be modulated by the modulation scheme is below the maximum number of transmission bits per symbol, the transmitter discards the remaining bits and modulates the next symbol. The receiver demodulates a received signal in accordance with a modulation scheme which enables the transmission of one or more bits per symbol, and when the number of demodulated bits per symbol is smaller than the maximum number of transmission bits per symbol, the receiver deinterleaves and decodes the received signal after the demodulation on the assumption that the received signal has likelihoods of zero as much as the number of missing bits. In this way, the communication system can make communications without significant degradation in characteristics even if an error occurs in information on the modulation scheme communicated between the transmitter and receiver. Further, without the need for communicating the information on the modulation scheme between the transmitter and receiver, the receiver modulates a received signal based on a channel quality in accordance with a selected modulation scheme which has a higher modulation level as the channel quality is higher, thereby making it possible to switch the number of bits which are communicated per symbol in accordance with variations in the situation on a channel.

Also, to achieve the above object, in a communication system according to a second aspect of the present invention, a transmitter and a receiver share a maximum number of transmission bits per symbol as a parameter. The transmitter modulates an encoded and interleaved transmission signal in accordance with a modulation scheme which enables the transmission of one or more bits per symbol. When the number of bits per symbol which can be modulated by the modulation scheme is below the maximum number of transmission bits per symbol, the transmitter discards the remaining bits and modulates the next symbol. The receiver demodulates a received signal in accordance with a modulation scheme which enables the transmission of one or more bits per symbol. The receiver reduces the absolute value of a likelihood of a signal corresponding to a bit assigned to a lower bit of a symbol in accordance with the channel quality before deinterleaving and decoding the signal subsequent to the demodulation, thereby making it possible to switch the number of bits communicated per symbol in accordance with variations in the situation on a channel, without the need for communicating information on the modulation scheme between the transmitter and receiver.

Further, in the first and second aspects of the present invention in common, the receiver notifies the transmitter whether or not a signal has been successfully decoded. When notified that the signal has been unsuccessfully decoded, the transmitter encodes a codeword based on the same information as that used to encode the signal which has been unsuccessfully decoded, as notified thereto, and transmits part of the codeword which has been transmitted or part of the codeword which has not been transmitted, so that a necessary and sufficient amount of information can be transmitted in accordance with the modulation level at which the receiver can actually receive the signal through the channel. The resulting communication system is capable of making communications at an optimal throughput in accordance with variations in the situation on the channel.

As appreciated from the foregoing, the present invention provides a communication system which can switch the number of bits communicated per symbol in accordance with variations in the situation on a channel, without the need for communicating information on an employed modulation scheme between a transmitter and a receiver, to make communications at an optimal throughput in accordance with variations in the situation on the channel.

Other objects, features and advantages of the invention will become apparent from the following description of the embodiments of the invention taken in conjunction with the accompanying drawings.

DETAILED DESCRIPTION OF THE EMBODIMENTS

In the following, several embodiments of the present invention will be described with reference to the accompanying drawings. While the following embodiments are described in connection with a scheme which sets a maximum number of transmission bits per symbol to six bits, and employs 64 QAM for modulation in a transmitter and 64 QAM or 16 QAM or QPSK for demodulation in a receiver, the present invention is not limited to such a maximum number of transmission bits or modulation schemes, but can be similarly applied to a more general scheme which sets the maximum number of transmission bits per symbol to 2 m bits, and employs $2^{2m}$ QAM for modulation in a transmitter and $2^{2k}$ QAM (k is a natural number equal to or less than m) for demodulation in a receiver. Also, assume in the foregoing that when k=1, 4 QAM represents the same modulation scheme as QPSK.

Figure 1:
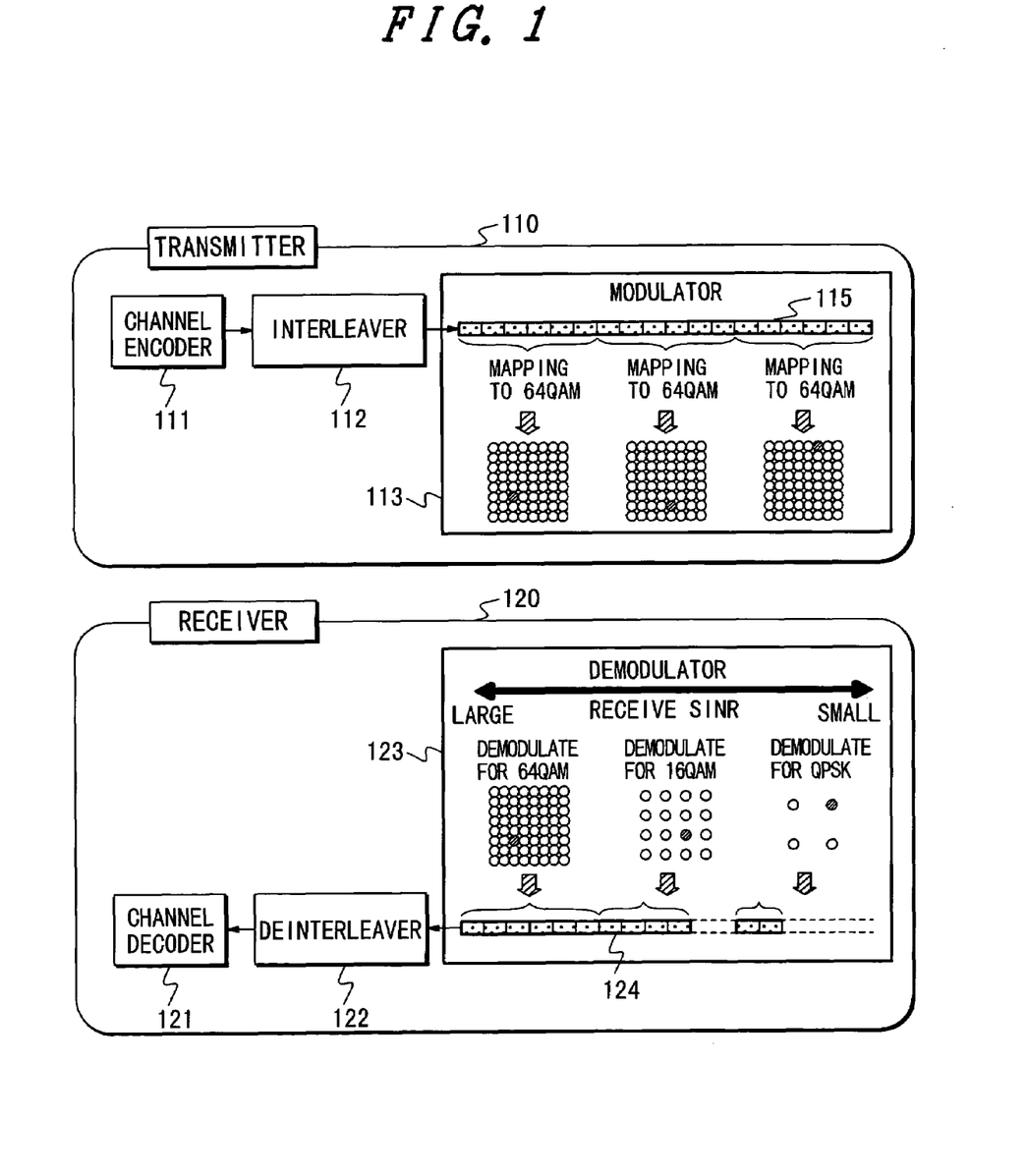
FIG. 1 is a schematic diagram illustrating a first exemplary modulation scheme in the present invention.

FIG. 1 illustrates a schematic diagram which represents a first implementation of a modulation/demodulation method in the present invention. First, a maximum number of transmission bits per symbol is determined between a transmitter 110 and a receiver 120. The maximum number of transmission bits per symbol may be communicated from either the transmitter 110 or receiver 120 to the other at the outset of a communication between the transmitter 110 and receiver 120, or during a communication as appropriate. Alternatively, a previously determined value inherent to a particular system may be used for the maximum number of transmission bits.

In the transmitter 110, a channel encoder 111 first encodes a data signal to be transmitted with a channel code, and an interleaver 112 interleaves the encoded data signal.

A modulator 113 divides an interleaved signal bit sequence 115 into subsets of the maximum number of transmission bits per symbol, into subsets of six bits in the example of FIG. 1, and assigns the respective subsets of the signal bit sequence 115 to associated signal points for modulation. Finally, the modulated signal bit sequence 115 are transmitted from the transmitter 110.

In this event, when the number of transmission bits per symbol defined by a modulation scheme used for the modulation is smaller than the maximum number of transmission bits per symbol, each modulation symbol is created using only the number of transmission bits per symbol defined by the modulation scheme used for the modulation. In the example of FIG. 1, assuming that 16 QAM is used for the modulation, four of six bits provided for creating a modulation symbol are used to create the modulation symbol, with the remaining two bits being left unused.

In the receiver 120, a demodulator 123 demodulates received symbols based on the channel quality upon receipt of the symbols, i.e., in accordance with a modulation scheme which has a higher modulation level as the channel quality is higher. In the example of FIG. 1, the received symbols are demodulated in accordance with 64 QAM when the channel quality is the highest; in accordance with 16 QAM when the channel quality is low; and in accordance with QPSK when the channel quality is lower, to create a demodulated signal sequence 124.

Here, when received symbols are demodulated in accordance with a modulation scheme which defines the number of transmission bits smaller than the maximum number of transmission bits per symbol, a likelihood resulting from the demodulation is given as it is to the demodulated signal sequence 124 for the demodulated bits, while a likelihood of zero is given to the demodulated signal sequence 124 for missing bits.

The demodulated signal sequence 124 is deinterleaved in a deinterleaver 122, and then a channel code is decoded in a channel decoder 121. In the decoding of the channel code, the likelihood of zero given to the missing bits, which occur when a received symbol is demodulated in accordance with a modulation scheme with a lower modulation level, does not adversely affect the likelihood given to the other bits, but provides a similar advantage of increasing the encoding rate of the channel code, so that the channel code can be correctly decoded.

In the foregoing description, a high channel quality is found, for example, when the power of a received signal is high, or noise power is low; when interference power is low; when SINR (signal-to-interference and to-noise power ratio) is high; when BER (bit error rate) is high; and the like. On the other hand, a low channel quality is found in the reverse cases to the foregoing.

Alternatively, the modulation/demodulation method in the present invention can change the likelihood after demodulation. This alternative modulation/demodulation method will be described as a second implementation with reference to the schematic diagram of FIG. 2.

Figure 2:
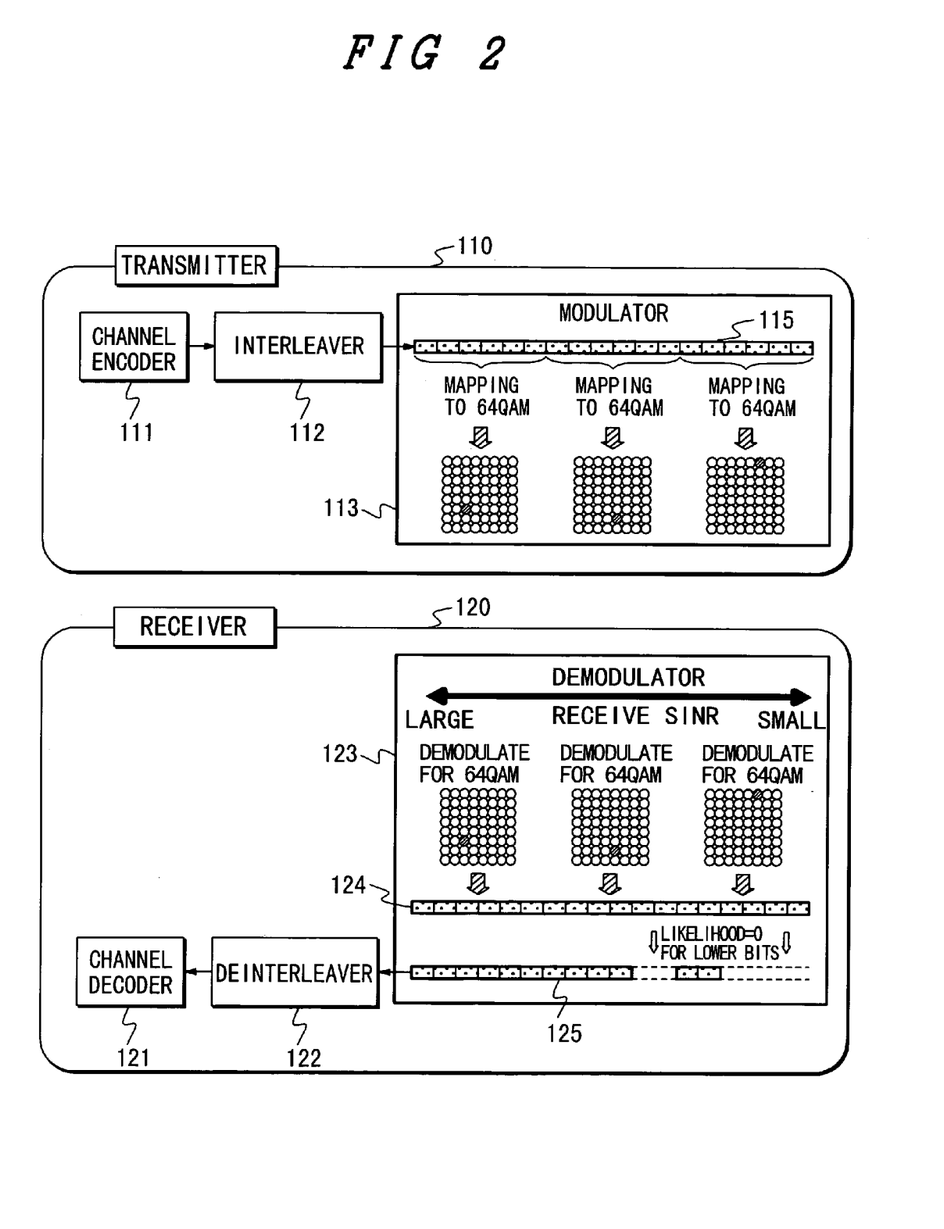
FIG. 2 is a schematic diagram illustrating a second exemplary modulation scheme in the present invention.

Similar to the method illustrated in FIG. 1, the maximum number of transmission bits per symbol is first determined between the transmitter 110 and receiver 120.

In the transmitter 110, the channel encoder 111 first encodes a data signal to be transmitted with a channel code, and the interleaver 112 interleaves the encoded data signal. The modulator 113 divides an interleaved signal bit sequence 115 into subsets of the maximum number of transmission bits per symbol, into subsets of six bits in the example of FIG. 2, and assigns the respective subsets of the signal bit sequence 115 to associated signal points for modulation. Finally, the modulated signal bit sequence 115 are transmitted from the transmitter 110.

In this event, when the number of transmission bits per symbol defined by a modulation scheme used for the modulation is smaller than the maximum number of transmission bits per symbol, each modulation symbol is created using only the number of transmission bits per symbol defined by the modulation scheme used for the modulation. In the example of FIG. 2, assuming that 16 QAM is used for the modulation, four of six bits provided for creating a modulation symbol are used to create the modulation symbol, with the remaining two bits being left unused.

In the receiver 120, the demodulator 123 first demodulates received symbols in accordance with a modulation scheme which corresponds to the maximum number of transmission bits per symbol to create a demodulated signal sequence 124.

In accordance with the channel quality upon receipt of the demodulated symbols, the likelihood of zero is given to signals corresponding to lower bits of a modulation symbol, if the channel quality is low, to create a likelihood controlled demodulated signal sequence 125. Here, the likelihood of zero is given to higher bits as the channel quality is lower.

The likelihood controlled demodulated signal sequence 125 is deinterleaved in the deinterleaver 122, and then the channel code is decoded in the channel decoder 121. In the decoding of the channel code, the likelihood of zero given to the missing bits, which occur when a received symbol is demodulated in accordance with a modulation scheme with a lower modulation level, does not adversely affect the likelihood given to the other bits, but provides a similar advantage of increasing the encoding rate of the channel code, so that the channel code can be correctly decoded.

While in the example of FIG. 2, the likelihood of zero is given to lower bits in the creation of the likelihood controlled demodulated signal sequence 125, a similar advantage can be provided by reducing the absolute values of the likelihoods for lower bits more than the demodulated result, rather than giving the likelihood of zero. For this purpose, the likelihood controlled demodulated signal sequence 125 can be created by multiplying the demodulated signal sequence 124 by a non-negative coefficient which varies with a non-negative gradient as the channel quality is improved, and has an absolute value which is not so large as to correspond to lower bits of symbols of a signal sequence.

While the foregoing description has been made on a modulation scheme which employs $2^{2m}$ QAM, the present invention is not limited to the application in $2^{2m}$ QAM, but can be applied to any modulation scheme as long as it can recursively extend the signal point constellation using, for example, a gray code to assign a bit to a signal point. In addition, a similar control can be applied as well to $2^m$ PSK and $2^m$ ASK, where m is the maximum number of transmission bits per symbol.

Next, the configuration of the transmitter and receiver, as well as the flow of signals in accordance with the modulation/demodulation scheme of the present invention will be described with reference to FIGS. 3, 4 which illustrate the configuration of the transmitter and receiver, respectively.

It should be noted that the following description will be made only on the application of the modulation/demodulation scheme according to the present invention to communications from the transmitter to the receiver, but the present invention can be actually applied to communications from the receiver to the transmitter as well. Also, the terms "transmitter" and "receiver" used herein refer to an RF station which modulates a data signal, and an RF station which demodulates a data signal, respectively, so that either may be used as a base station or a mobile terminal. In addition, the communication method of the present invention may be adapted to a point-to-point communication between terminal devices.

Figure 3:
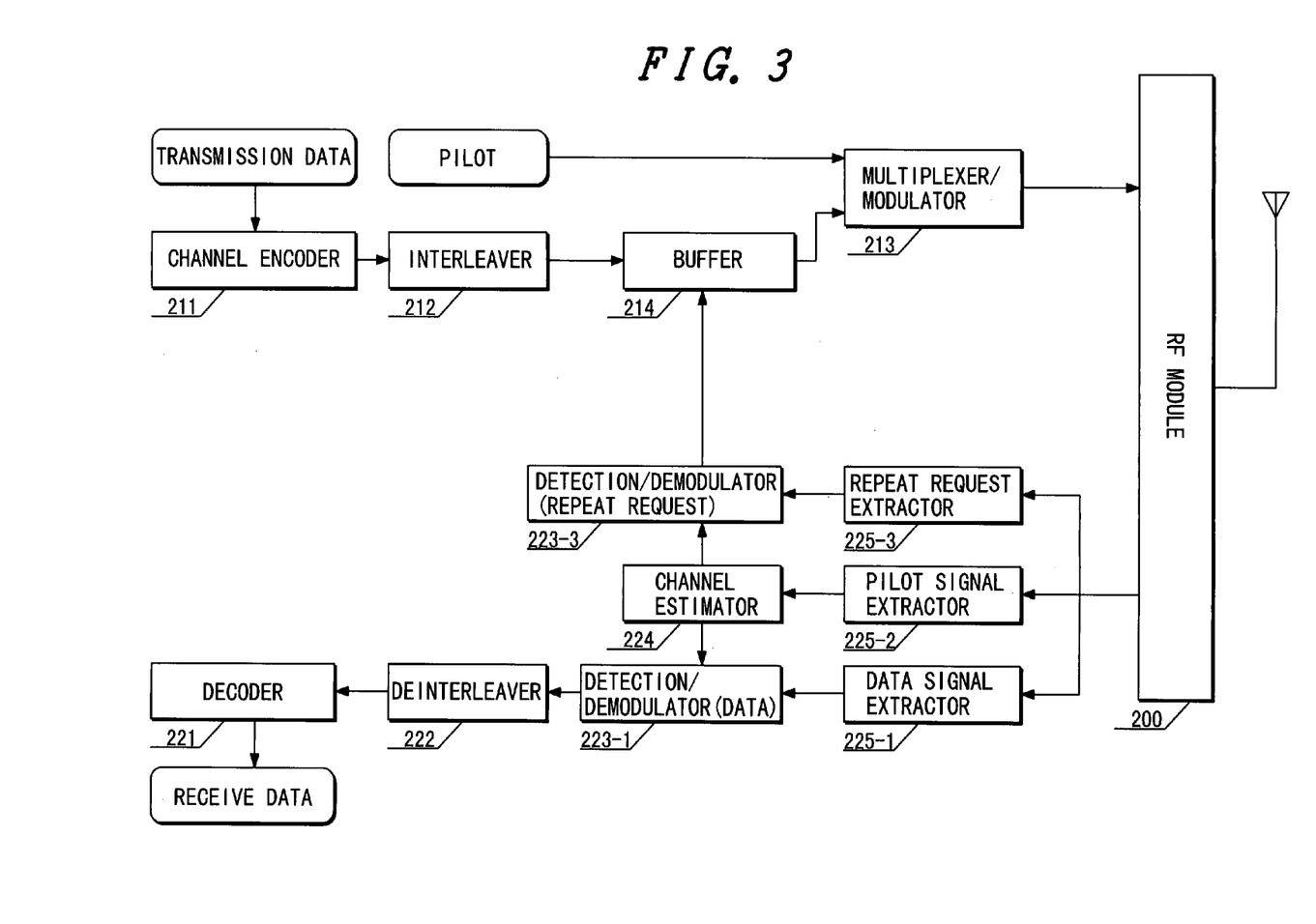
FIG. 3 is a block diagram illustrating an exemplary configuration of a transmitter in a first and a second embodiments of the present invention.
Figure 4:
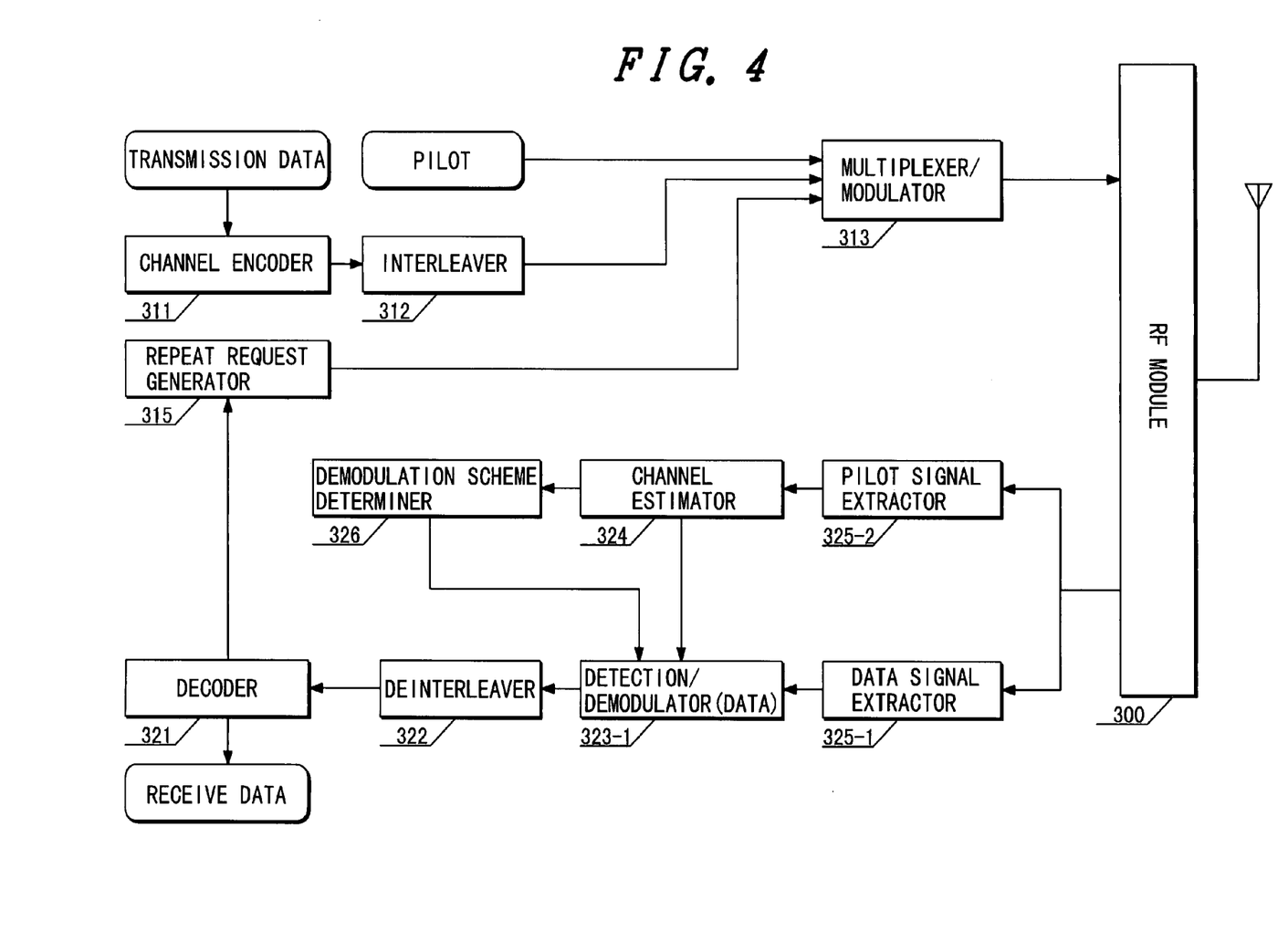
FIG. 4 is a block diagram illustrating an exemplary configuration of a receiver in the first embodiment.
Figure 5:
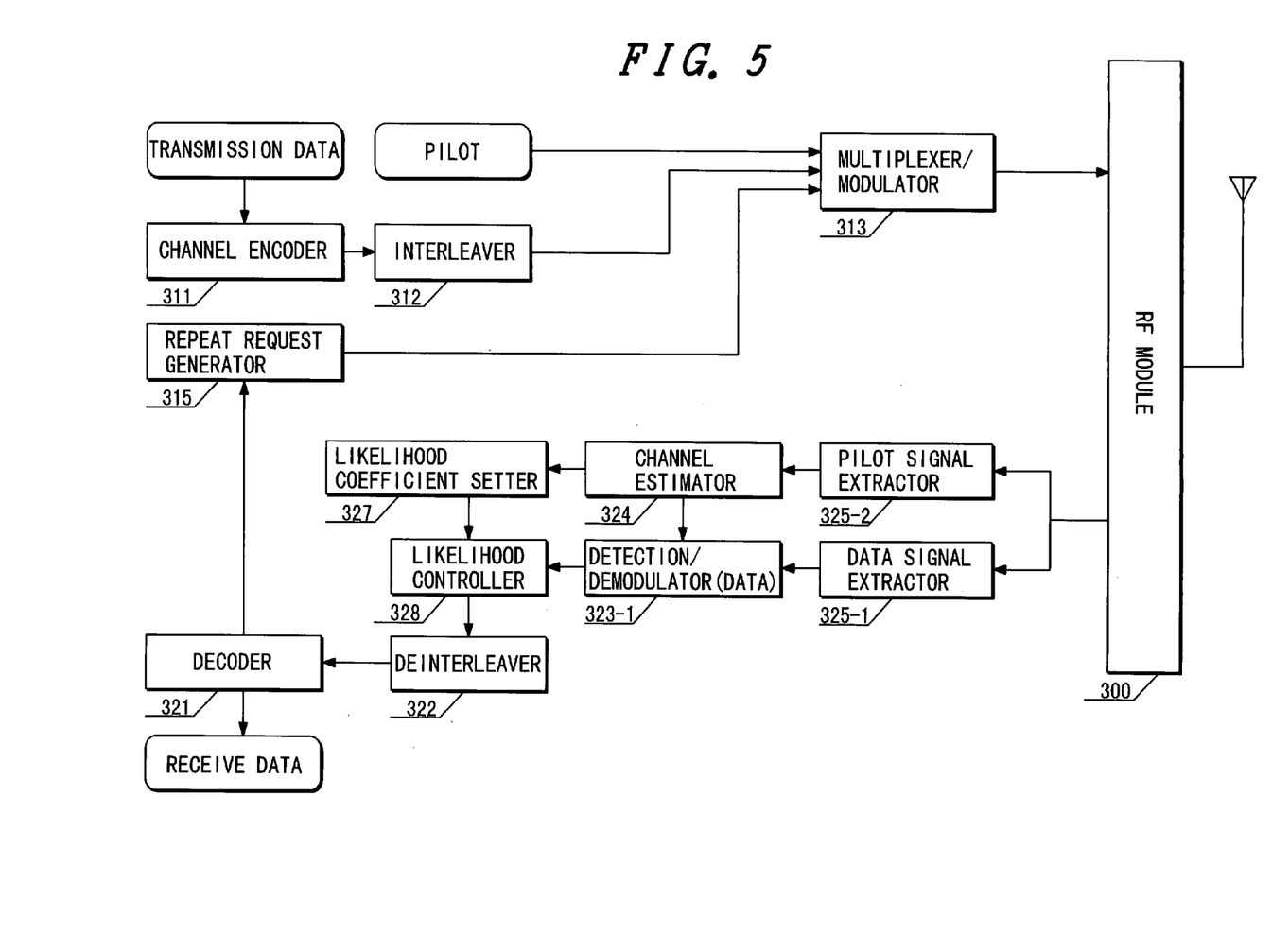
FIG. 5 is a block diagram illustrating an exemplary configuration of a receiver in the second embodiment.

FIG. 3 illustrates the configuration of a transmitter which is common to the first and second implementations of the present invention, FIG. 4 illustrates the configuration of a receiver when the first implementation of the present invention is applied, and FIG. 5 illustrates the configuration of a receiver when the second implementation of the present invention is applied.

In the following, the configuration of a communication system, and a signal flow when the first implementation of the present invention is applied to the system, will be described with reference to FIGS. 3 and 4.

In the transmitter illustrated in FIG. 3, transmission data is encoded in a channel encoder 211 with a channel code, interleaved in an interleaver 212, and stored in a pre-modulation buffer 214. The data stored in the pre-modulation buffer 214 is sent to a multiplexer/modulator 213 in response to a repeat request signal, and modulated in accordance with a modulation scheme which has been previously determined between the transmitter and receiver or which is inherent to the system, or a modulation scheme which has a lower modulation level than the former modulation scheme.

The modulated data is multiplexed with a pilot signal before it is transmitted through an RF module 200.

Signals transmitted from the transmitter are received by a RF module 300 in the receiver of FIG. 4. Within the signals received by the RF module 300, a pilot signal is extracted by a pilot signal extractor 325-2, and sent to a channel estimator 324. The channel estimator 324 estimates variations in amplitude and phase of signals on a channel, which are notified to a detection/demodulator 323-1, and measures the signal power, noise power, interference power, and the like, and communicates information on the channel quality to a demodulation scheme determination unit 326. The demodulation scheme determination unit 326 determines a modulation scheme which has a higher modulation level as the channel quality is higher, as mentioned above, based on the information on the channel quality, and notifies the detection/demodulator 323-1 of the determined modulation scheme.

On the other hand, within the signals received by the RF module 300, a data signal communicated from the transmitter to the receiver is extracted by a data extractor 325-1, and sent to the detection/demodulator 323-1. The detection/demodulator 323-1 demodulates the data signal in accordance with the modulation scheme notified from the demodulation scheme determination unit 326 and based on the information on variations in amplitude and phase communicated from the channel estimator 324, and sends the demodulated signal to a deinterleaver 322. Here, when the modulation scheme notified from the demodulation scheme determination unit 326 has a modulation level lower than the modulation scheme previously determined between the transmitter and receiver, demodulated signals are added on the assumption that the receiver has received signals having the likelihood of zero by the number of missing bits per symbol, and the resulting signals are sent to the deinterleaver 322.

The deinterleaver 322 deinterleaves the demodulated signals sent thereto, and sends the deinterleaved signals to a decoder 321.

The decoder 321 decodes the demodulated signals if it determines that the signals contain sufficient information for decoding.

For implementing a function of retransmitting a data signal, the following features are provided. The decoder 321 notifies the repeat request generator 315 that no retransmission is required when the decoding is successful, and that a retransmission is required when the decoding falls or when no data signal is decoded.

The repeat request generator 315 generates a repeat request signal in accordance with whether or not a retransmission is required, as notified from the decoder 321.

When there is a data signal which is encoded in the channel encoder 311 for transmission from the receiver to the transmitter, the data signal interleaved by the interleaver 312, as well as the repeat request signal generated by the repeat request generator 315, and a pilot signal are multiplexed and modulated in the multiplexer/modulator 313, and the resulting multiplexed signals are transmitted through the RF module 300.

The signals transmitted from the receiver is received by the RF module 200 of the transmitter. Within the signals received by the RF module 200, the pilot signal is extracted by a pilot extractor 225-2, and a channel estimator 224 estimates variations in amplitude and phase of the signals on the channel from the pilot signal, and notifies the detection/demodulators 223-1, 223-3 of the estimated variations in amplitude and phase.

When the data signal is transmitted from the receiver to the transmitter, the data signal communicated from the receiver to the transmitter, within signals received by the RF module 200, is extracted by a data signal extractor 225-1, and demodulated by the detection/demodulator 223-1 using the information on the variations in amplitude and phase, estimated by the channel estimator 224, deinterleaved by a deinterleaver 222, and decoded by a decoder 221 to create received data.

Within the signals received by the RF module 200, the repeat request signal is extracted in a repeat request extractor 225-3, and demodulated by the detection/demodulator 223-3 using the information on the variations in amplitude and phase, estimated by the channel estimator 224, and communicated to the pre-modulation buffer 214.

Upon receipt of a notification from the receiver that a retransmission is required, the pre-modulation buffer 214 outputs a part (either identical to or different from a previously transmitted part) of a signal encoded from the same data as a signal requested for retransmission. Conversely, upon receipt of a notification from the receiver that no retransmission is required, the pre-modulation buffer 214 outputs a part of a signal encoded from data different from data encoded for a signal which is not requested for retransmission. This retransmission control permits the transmission of a necessary and sufficient data signal in accordance with a signal actually demodulated in the receiver, so that an improved throughput is expected.

Next, the configuration of a communication system, and a signal flow when the second implementation of the present invention is applied to the system, will be described with reference to FIGS. 3 and 5.

In the transmitter illustrated in FIG. 3, transmission data is encoded in the channel encoder 211 with a channel code, interleaved in the interleaver 212, and stored in the pre-modulation buffer 214.

The data stored in the pre-modulation buffer 214 is sent to the multiplexer/modulator 213 in response to a repeat request signal, and modulated in accordance with a modulation scheme which has been previously determined between the transmitter and receiver or which is inherent to the system, or a modulation scheme which has a lower modulation level than the former modulation scheme.

Signals transmitted from the transmitter are received by a RF module 300 in the receiver of FIG. 5. Within the signals received by the RF module 300, a pilot signal is extracted by a pilot signal extractor 325-2, and sent to a channel estimator 324. The channel estimator 324 estimates variations in amplitude and phase of signals on a channel, which are notified to a detection/demodulator 323-1, and measures the signal power, noise power, interference power, and the like and communicates information on the channel quality to a likelihood coefficient setter 327.

The likelihood coefficient setter 327 finds a likelihood coefficient which is multiplied by a likelihood for each of bits in a symbol based on a notified channel quality, and communicates the likelihood coefficient to a likelihood controller 328.

On the other hand, within the signals received by the RF module 300, a data signal communicated from the transmitter to the receiver is extracted by a data extractor 325-1, and sent to the detection/demodulator 323-1. The detection/demodulator 323-1 demodulates the data signal in accordance with the modulation scheme previously determined between the transmitter and receiver and based on the information on the variations in amplitude and phase communicated from the channel estimator 324, and sends the demodulated signal to a likelihood controller 328. The likelihood controller 328 creates a likelihood controlled demodulated signal by multiplying each of demodulated signals sent from the detection/demodulator 323-1 by the likelihood coefficient communicated from the likelihood coefficient setter 327 in accordance with which bit of a symbol the signal corresponds to, and sends the likelihood controlled demodulated signal to a deinterleaver 322.

The deinterleaver 322 deinterleaves the demodulated signals sent thereto, and sends the deinterleaved signals to a decoder 321.

The decoder 321 decodes the demodulated signals if it determines that the signals contain sufficient information for decoding.

For implementing a function of retransmitting a data signal, the following features are provided. The decoder 321 notifies the repeat request generator 315 that no retransmission is required when the decoding is successful, and that a retransmission is required when the decoding falls or when no data signal is decoded.

The repeat request generator 315 generates a repeat request signal in accordance with whether or not a retransmission is required, as notified from the decoder 321.

When there is a data signal which is encoded in the channel encoder 311 for transmission from the receiver to the transmitter, the data signal interleaved by the interleaver 312, as well as the repeat request signal generated by the repeat request generator 315, and a pilot signal are multiplexed and modulated in the multiplexer/modulator 313, and the resulting multiplexed signals are transmitted through the RF module 300.

When there are data signals which are to be transmitted from the receiver to the transmitter, the data signals transmitted from the receiver are received by the RF module 200 of the transmitter. Within the signals received by the RF module 200, the pilot signal is extracted by the pilot extractor 225-2, and the channel estimator 224 estimates variations in amplitude and phase of the signals on the channel from the pilot signal, and notifies the detection/demodulators 223-1, 223-3 of the estimated variations in amplitude and phase.

Within signals received by the RF module 200, the data signal communicated from the receiver to the transmitter is extracted by the data signal extractor 225-1, and demodulated by the detection/demodulator 223-1 using the information on the variations in amplitude and phase, estimated by the channel estimator 224, deinterleaved by the deinterleaver 222, and decoded by the decoder 221 to create received data.

Within the signals received by the RF module 200, the repeat request signal is extracted in the repeat request extractor 225-3, and demodulated by the detection/demodulator 223-3 using the information on the variations in amplitude and phase, estimated by the channel estimator 224, and communicated to the pre-modulation buffer 214.

Upon receipt of a notification from the receiver that a retransmission is required, the pre-modulation buffer 214 outputs a part (either identical to or different from a previously transmitted part) of a signal encoded from the same data as a signal requested for retransmission. Conversely, upon receipt of a notification from the receiver that no retransmission is required, the pre-modulation buffer 214 outputs a part of a signal encoded from data different from data encoded for a signal which is not requested for retransmission. This retransmission control permits the transmission of a necessary and sufficient data signal in accordance with a signal actually demodulated in the receiver, so that an improved throughput is expected.

The likelihood coefficient set in the likelihood coefficient setter 327 may be set to be larger as the channel provides a higher quality or for a higher bit of a symbol, thus contributing to improvements on the demodulation scheme of the present invention.

However, the likelihood coefficient, which is set to be larger, need not be monotonously increased, but may have the gradient of zero for the channel quality or may have the same value for upper bits and lower bits of a symbol.

Figure 6:
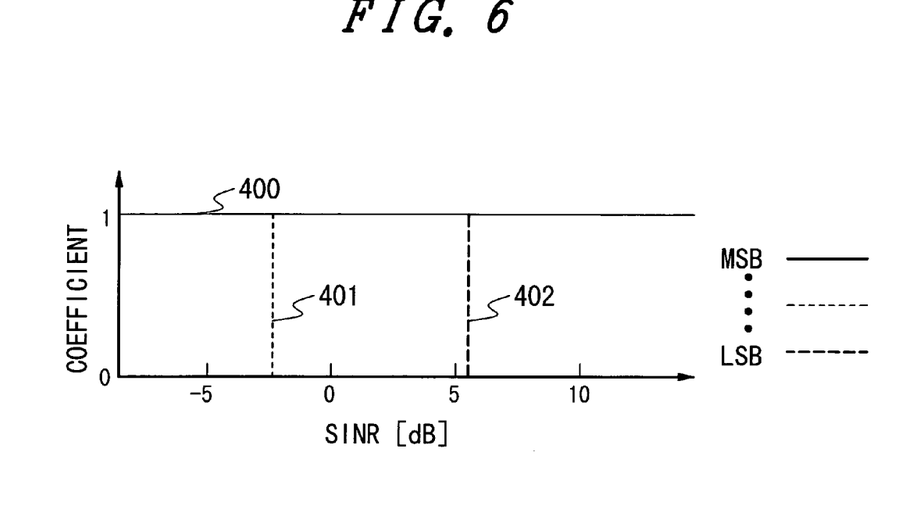
FIG. 6 shows a first exemplary likelihood coefficient in the second embodiment.

FIG. 6 shows likelihood coefficients used in demodulation of signals transmitted in accordance with 64QAM, when it is calculated on the basis of the channel quality represented by SNIR (signal-to-interference and to-noise power ratio). Likelihood coefficients 401, 402 for each of bits in symbols except for the most significant bit take a binary value of "0" or "1" beyond certain thresholds, respectively. With the use of these likelihood coefficients, the same advantage can be provided as the modulation scheme of the first embodiment having a low modulation level which sets the likelihood of zero to lower bits in accordance with the channel quality.

Figure 7:
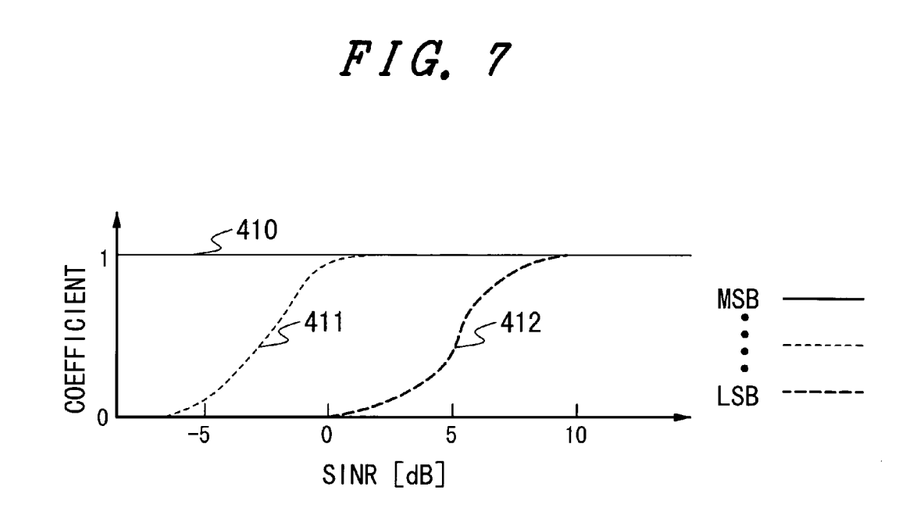
FIG. 7 shows a second exemplary likelihood coefficient in the second embodiment.

FIG. 7 shows another example of the likelihood coefficients used in demodulation of signals transmitted in accordance with 64 QAM. Each of the likelihood coefficients 411, 412 for each of bits in symbols is represented by a function having a positive gradient such that it is larger as the channel quality is higher. The likelihood is reduced for lower bits when the channel quality is lower to provide stable communications, though a maximum throughput is low, as is the case with communications in accordance with a modulation scheme which has a low modulation level. Conversely, the likelihood is not reduced for any bit when the channel quality is high to provide communications at a high maximum throughput, as is the case with communications in accordance with a modulation scheme having a high modulation level.

In the foregoing first and second embodiments, the repeat request generator 315 generates either a combination of an index indicative of a code successfully decoded by the decoder 321 and a signal indicative of a negative repeat request, or a combination of an index indicative of a code unsuccessfully decoded by the decoder 321 and a signal indicative of a positive repeat request, or a combination of an index indicative of a code not decoded by the decoder 321 due to a lack of information and a signal indicative of a positive repeat request. The resulting repeat request signal is transmitted from the receiver to the transmitter.

Figure 8:
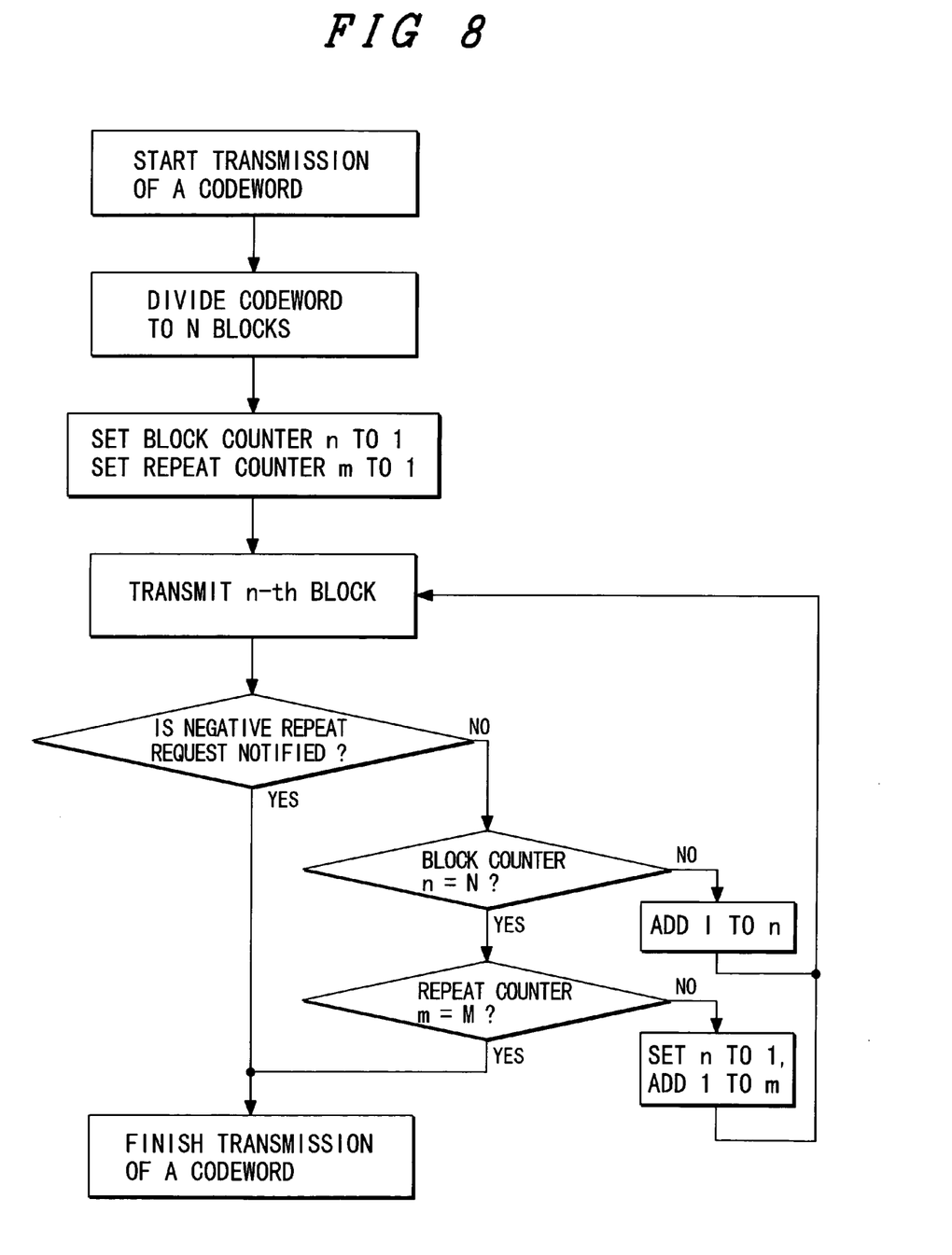
FIG. 8 is a flow chart illustrating a retransmission control process in the first and second embodiments.

In the foregoing first and second embodiments, the storage of encoded data in the pre-modulation buffer 214 and the transmission of stored data from the pre-modulation buffer 214 may be carried out, for example, by a process as illustrated in a flow of FIG. 8.

In the flow of FIG. 8, the pre-modulation buffer 214 stores encoded and interleaved transmission data for each codeword, and divides respective codewords into N blocks. The divided codeword is transmitted on a block-by-block basis, and when a repeat request signal from the receiver indicates that no retransmission is required, the transmission of the codeword is finished, followed by transmission of another codeword. On the other hand, if the repeat request signal from the receiver indicates that retransmission is required, a block of the same codeword different from previously transmitted one is transmitted. Here, if all of N blocks, making up the same codeword, have been transmitted, the same block as the one which has been transmitted is repeatedly transmitted. In this event, unlike the flow chart of FIG.

8, a block dividing method may be changed for each repetition. Also, when the number of blocks transmitted for a certain codeword has reached a maximum number M of times of repetitions, the transmission of the codeword is regarded as a failure, and thus aborted. When the receiver has successfully decoded a codeword and transmitted a repeat request signal indicative of a negative repeat request, the receiver finishes the codeword which has been so far received, and starts receiving the next codeword. On the other hand, when the receiver has failed to decode a codeword and transmitted a repeat request signal indicative of positive repeat request, the receiver continues to receive blocks of the same codeword, and attempts to again decode the codeword when it determines that sufficient information has been provided for the decoding.

In the foregoing first and second embodiments, the determination as to whether sufficient information has been provided for the decoding in the decoder 321 can be made based on whether or not the sum of the absolute values of likelihoods of signals sent to the decoder 321 is equal to or larger than a certain value, or whether or not the total sum of channel capacities per bandwidth upon receipt of signals, which can be estimated from the signal-to-noise power ratio estimated in the channel estimator 224, is equal to or larger than a certain value, for example, equal to or larger than the number of bits of received signals after decoding.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A wireless transmitter for transmitting a signal to a wireless receiver, comprising:
   an encoder for encoding the transmission signal;
   a pre-modulation buffer for storing the encoded transmission signal;
   a modulator for modulating the encoded transmission signal in accordance with one of a plurality of modulation schemes which define a first number of transmission bits, which is the number of transmission bits per symbol in said wireless transmitter, to be equal to or smaller than a second number of transmission bits which is a previously defined number of transmission bits per symbol; and
   a RF module for transmitting the modulated transmission signal, wherein:
   information on said second number of transmission bits is shared with said wireless receiver;
   the transmission signal is read from said pre-modulation buffer every said second number of transmission bits and inputted into said modulator; and
   said modulator modulates said first number of transmission bits of the transmission signal inputted thereto, and does not modulate the remaining bits of the transmission signal which is the difference between the second number of transmission bits and the first number of transmission bits.

2. A wireless transmitter according to claim 1, wherein:
   said wireless transmitter transmits the information on said second number of transmission bits to said wireless receiver prior to the transmission of the transmission signal, such that the information on said second number of transmission bits is shared with said wireless receiver.

3. A wireless transmitter according to claim 1, wherein:
   said wireless transmitter is responsive to a repeat request signal transmitted from said wireless receiver to retransmit an encoded transmission signal identified by said repeat request signal, said encoded transmission signal being stored in said pre-modulation buffer.

4. A wireless transmitter according to claim 1, wherein:
   the encoded transmission signal stored in said pre-modulation buffer is divided into a plurality of blocks on a codeword-by-codeword basis, and inputted to said modulator on a block-by-block basis;
   the encoded transmission signal is inputted to said modulator on a block-by-block basis under the control of the repeat request signal transmitted from said wireless receiver; and
   said wireless transmitter stops transmitting the codeword when the received repeat request signal indicates that retransmission of the codeword of the transmission signal is not required in said wireless receiver, and performs operations for transmitting a codeword next to the codeword.

5. A wireless receiver for receiving a signal transmitted from a wireless transmitter, comprising:
   an RF module for receiving the signal;
   a demodulator for demodulating the received signal in accordance with one of a plurality of modulation schemes which defines a third number of transmission bits, which is the number of transmission bits per symbol, to be equal to or smaller than a fourth number of transmission bits which is a previously defined maximum number of transmission bits per symbol; and
   a decoder for decoding the demodulated received signal, wherein information on said fourth number of transmission bits is shared with said wireless transmitter; and
   said demodulator outputs said fourth number of transmission bits of the demodulated received signal each time said demodulator demodulates one symbol.

6. A wireless receiver according to claim 5, further comprising:
   a channel quality determination unit for determining a channel quality between said wireless receiver and said wireless transmitter,
   wherein said third number of transmission bits is determined on the basis of the determined channel quality.

7. A wireless receiver according to claim 6, wherein said channel quality determination unit determines the channel quality using a signal received from said wireless transmitter.

8. A wireless receiver according to claim 5, wherein said demodulator outputs a demodulated signal sequence including likelihood information for the third number of transmission bits each time said demodulator demodulates one symbol, and said demodulator outputs a likelihood of zero or near zero for a number of lower bits equal to the difference between said fourth number of transmission bits and said third number of transmission bits.

9. A wireless receiver according to claim 5, wherein said wireless receiver receives the information on said fourth number of transmission bits communicated from said wireless transmitter.

10. A wireless receiver according to claim 5, wherein said wireless receiver receives information on the number of transmission bits per symbol in said wireless transmitter from said wireless transmitter, and determines said third number of transmission bits based on the received information.

11. A wireless receiver according to claim 5, wherein:

said wireless receiver receives a signal transmitted from said wireless transmitter, said signal including codewords, each of which is divided into a plurality of blocks such that the signal is transmitted on a block-by-block basis, and stores the blocks; and said decoder decodes blocks of the received signal corresponding to part or all of a codeword, such that said wireless receiver generates a repeat request signal indicative of whether or not the blocks have been successfully decoded on the basis of whether or not the decoding is successful, and transmits the repeat request signal to said wireless transmitter.

12. A wireless receiver according to claim 11, wherein said decoder decodes the blocks when determining that the stored received signal includes sufficient information for decoding.

13. A wireless receiver according to claim 11, wherein said wireless receiver stops receiving the received codeword when said wireless receiver has transmitted the repeat request signal indicative of successful decoding to said wireless transmitter, and starts receiving blocks corresponding to a codeword next to the codeword transmitted in response to the repeat request signal.

14. A signal transmission/reception method in a wireless communication system for transmitting a signal from a first wireless station to a second wireless station, wherein said first wireless station and said second wireless station share information on a first number of transmission bits which is a maximum number of transmission bits per symbol, said method comprising the steps of:

encoding the transmission signal in said first wireless station;

inputting said encoded transmission signal to a modulator of said first wireless station every said first number of transmission bits;

modulating in said modulator the encoded transmission signal in accordance with one of a plurality of modulation schemes which define a second number of transmission bits, which is the number of transmission bits per symbol in said first wireless station, to be equal to or smaller than said first number of transmission bits, said modulating step including modulating said second number of transmission bits of the inputted transmission signal and not modulating a number of bits of the transmission signal equal to the difference between said first number of transmission bits and said second number of transmission bits;

transmitting the modulated transmission signal from said first wireless station to said second wireless station;

receiving a transmission signal from said first wireless station in said second wireless station;

demodulating in a demodulator of said second wireless station the received signal in accordance with one of a plurality of modulation schemes which define a third number of transmission bits, which is the number of transmission bits per symbol in said second wireless station, to be equal to or smaller than said first number of transmission bits;

outputting from said demodulator said first number of transmission bits of the demodulated received signal each time said demodulator demodulates one symbol; and decoding the demodulated received signal in a decoder of said second wireless station.

15. A signal transmission/reception method according to claim 14, further comprising the step of:

notifying said first number of transmission bits from said first wireless station to said second wireless station.

16. A signal transmission/reception method according to claim 14, further comprising the steps of:

notifying said second number of transmission bits from said first wireless station to said second wireless station; and determining said third number of transmission bits based on said second number of transmission bits in said second wireless station.

17. A signal transmission/reception method according to claim 14, further comprising the steps of:

estimating in said second wireless station a channel quality between said first wireless station and said second wireless station based on a signal received from said first wireless station; and determining said third number of transmission bits based on the estimated channel quality.

18. A signal transmission/reception method according to claim 14, wherein:

said step of transmitting includes the substep of dividing each of codewords representing the encoded transmission signal into a plurality of blocks, and the substep of transmitting the encoded transmission signal on a block-by-block basis; and said step of decoding includes the substep of decoding blocks corresponding to part or all of the codeword, wherein said method further comprises the step of transmitting a repeat request signal indicating whether or not the blocks have been successfully decoded from said second wireless station to said first wireless station.

19. A signal transmission/reception method according to claim 18, further comprising the steps of:

stopping the transmission of the blocks of the codeword in said first wireless station in response to the repeat request signal which indicates that the blocks have been successfully decoded; and finishing the reception of the codeword which has been successfully decoded, and starting receiving a codeword next to said codeword in said second wireless station.

20. A signal transmission/reception method according to claim 18, further comprising the steps of:

transmitting at least one identical or different block of the same codeword in said first wireless station in response to the repeat request signal which indicates that the blocks have been unsuccessfully decoded; and continuing to receive the codeword, and again attempting to decode one or more received blocks in said second wireless station.

* * * * *